US012661908B2

(12) United States Patent
Condello et al.

(10) Patent No.: US 12,661,908 B2
(45) Date of Patent: Jun. 23, 2026

(54) SYSTEM AND METHOD FOR APPLYING PRIMER TO MEDIA IN INKJET PRINTERS

(71) Applicant: Xerox Corporation, Norwalk, CT (US)

(72) Inventors: Anthony S. Condello, Webster, NY (US); Varun Sambhy, Pittsford, NY (US); Mark Petropoulos, Webster, NY (US); Peter M. Gulvin, Webster, NY (US); Seemit Praharaj, Webster, NY (US); Douglas K. Herrmann, Webster, NY (US); Christine A. Steurrys, Williamson, NY (US); Jason M. LeFevre, Penfield, NY (US); Palghat S. Ramesh, Pittsford, NY (US); Jorge A. Alvarez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 192 days.

(21) Appl. No.: 18/439,103

(22) Filed: Feb. 12, 2024

(65) Prior Publication Data

US 2025/0256517 A1 Aug. 14, 2025

(51) Int. Cl.
*B41J 11/00* (2006.01)
*B41J 2/01* (2006.01)

(52) U.S. Cl.
CPC .............. *B41J 11/002* (2013.01); *B41J 2/01* (2013.01)

(58) Field of Classification Search
CPC .......... B41J 11/002; B41J 2/01; B41J 11/0015
USPC .......................................................... 347/100
See application file for complete search history.

(56) References Cited

U.S. PATENT DOCUMENTS

| | | | | |
|---|---|---|---|---|
| 9,403,383 | B1 | 8/2016 | Liu et al. | |
| 9,604,471 | B2 | 3/2017 | Liu | |
| 2007/0171251 | A1* | 7/2007 | Sekimoto | B41J 11/007 347/22 |
| 2008/0062241 | A1* | 3/2008 | Yamashita | B41J 11/00214 347/224 |
| 2008/0310862 | A1* | 12/2008 | Hasegawa | B41J 29/38 399/13 |
| 2012/0229580 | A1 | 9/2012 | Ohba | |
| 2012/0287196 | A1* | 11/2012 | Boland | B41J 11/00212 347/16 |
| 2016/0023858 | A1* | 1/2016 | Mizuno | B65H 7/06 271/228 |
| 2016/0159120 | A1* | 6/2016 | Thayer | B41J 2/01 347/37 |
| 2017/0066937 | A1* | 3/2017 | Van Rens | C09D 11/107 |

(Continued)

OTHER PUBLICATIONS

Canon Solutions America. Hello, I'm the New VarioPrint i-Series+, https://pps.csa.canon.com/sites/default/files/2023-04/Hello-Im-the-New-VarioPrint-i-series-plus-BR_0.pdf. Accessed Jan. 9, 2024.

*Primary Examiner* — Jason S Uhlenhake
*Assistant Examiner* — Alexander D Shenderov
(74) *Attorney, Agent, or Firm* — Maginot Moore & Beck LLP

(57) ABSTRACT

An inkjet printer includes at least one printhead and a transfer member to apply primer onto media before the media is printed. The at least one printhead ejects drops of primer onto the transfer member and the transfer member forms a nip with a nip roller. Entry of media into the nip and entry of the primer image on the transfer member are synchronized to enable the primer image to be transferred to the media in the nip.

30 Claims, 4 Drawing Sheets

(56) References Cited

U.S. PATENT DOCUMENTS

| | | | | |
|---|---|---|---|---|
| 2020/0338882 | A1* | 10/2020 | Shimomura | H04N 1/32635 |
| 2022/0080748 | A1 | 3/2022 | Gerstner | |

* cited by examiner

SYSTEM AND METHOD FOR APPLYING PRIMER TO MEDIA IN INKJET PRINTERS

TECHNICAL FIELD

This disclosure relates generally to devices that produce ink images on media, and more particularly, to the application of primers to media in such printers prior to printing the media.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content that define the images. The actuators in the printheads respond to the firing signals by expanding into an ink chamber fluidly connected to a nozzle to eject ink drops from the nozzle onto an image receiving surface to form an ink image that corresponds to the digital image content used to generate the firing signals. The image receiving surface is usually a continuous web of media material or a series of media sheets.

Inkjet printers used for producing color images typically include multiple printhead modules. Each printhead module includes one or more printheads that typically eject a single color of ink. In a typical inkjet color printer, four printhead modules are positioned in a process direction with each printhead module ejecting a different color of ink. The four ink colors most frequently used are cyan, magenta, yellow, and black. The common nomenclature for such printers is CMYK color printers. Some CMYK color printers have two printhead modules that print each color of ink. The printhead modules that print the same color of ink are offset from each other by one-half of the distance between adjacent inkjets in a printhead in a cross-process direction to double the number of pixels per inch to increase the density of a line of the color of ink ejected by the printheads in the two modules. As used in this document, the term "process direction" means the direction of movement of the image receiving surface as it passes the printheads in the printer and the term "cross-process direction" means a direction that is perpendicular to the process direction in the plane of the image receiving surface.

The image quality of aqueous ink images printed onto various types of media varies according to the type of media being printed. Image quality is typically excellent when the aqueous ink is printed onto offset coated, non-glossy media because the ink remains on top of the coating. Aqueous ink printing onto uncoated, porous media, however, produces washed out looking images because the inks are absorbed into the fibers of the paper. To avoid this consequence, coatings are applied to porous media to reduce the absorption of the inks into the media. As used in this document, the term "primer" means liquid coatings that are applied to media to improve the image quality of the ink images over that which is achieved without the coatings. Primers reduce the interaction of the inks with the media since the primer is interposed between the media and the inks. Because the ink image is fixed to the primer layer rather than the media, the ink image can be more easily removed. The case of ink image removal from media is a significant factor in recycling printed media.

Primer is applied to coated media in one of two ways. In some printers, primer is applied to a single roller that extends across the widest extent of the media transport path in the cross-process direction. This roller is brought into contact with the media as the media passes the roller, and the primer is transferred to the media. The second method of applying primer uses a printhead that is fluidly coupled to a supply of primer and the printhead is operated in a manner similar to when the printhead is operated to eject ink drops onto media. The roller method is simpler than the printhead method but the printhead method enables only those areas where is to be ejected to be coated. Thus, the printhead method is more efficient. Additionally, if the media being treated is narrower in the cross-process direction than the media transport path, then roller applies primer to the vacuum belt of the media transport. The primer on the belt can have a detrimental impact on the belt surface or on the reverse side of media when wider media is later treated. Thus, inkjet printers would benefit from being able to treat different widths of media with primers without applying primers to the media transport belt.

SUMMARY

A new color inkjet printer is configured to treat different widths of media with primers without applying primer to the media transport belt. The color inkjet printer includes at least one printhead; a media transport for moving a media sheet through a print zone opposite the at least one printhead in a process direction; and a primer applicator that has: at least one printhead fluidly connected to a supply of primer; a transfer member positioned opposite the at least one printhead; a first actuator operatively connected to the transfer member, the actuator being configured to rotate the transfer member; a nip roller configured to form a nip with the transfer member; and a controller operatively connected to the at least one printhead and the first actuator. The controller is configured to: operate the at least one printhead to form primer images on the transfer member; and operate the first actuator to rotate the transfer member to transfer primer images from the transfer member onto media passing through the nip.

A new primer applicator for a color inkjet printer treats different widths of media with primers without applying primer to the media transport belt. The primer applicator includes at least one printhead fluidly connected to a supply of primer; a transfer member positioned opposite the at least one printhead; a first actuator operatively connected to the transfer member, the actuator being configured to rotate the transfer member; a nip roller configured to form a nip with the transfer member; and a controller operatively connected to the at least one printhead and the first actuator. The controller is configured to: operate the at least one printhead to form primer images on the transfer member; and operate the first actuator to rotate the transfer member to transfer primer images from the transfer member onto media passing through the nip.

A new method of operating a color inkjet printer treats different widths of media with primers without applying primer to the media transport belt. The method includes operating a media transport to move a plurality of media sheets through a print zone opposite at least one printhead in a process direction; forming a primer image on a transfer member; and transferring the primer image from the transfer member to the media before the media enters the print zone.

BRIEF DESCRIPTION OF THE DRAWINGS

The foregoing aspects and other features of a color inkjet printer and color inkjet printer operational method that is able to treat different widths of media with primers without applying primer to the media transport belt are explained in the following description, taken in connection with the accompanying drawings.

DETAILED DESCRIPTION

Figure 1:
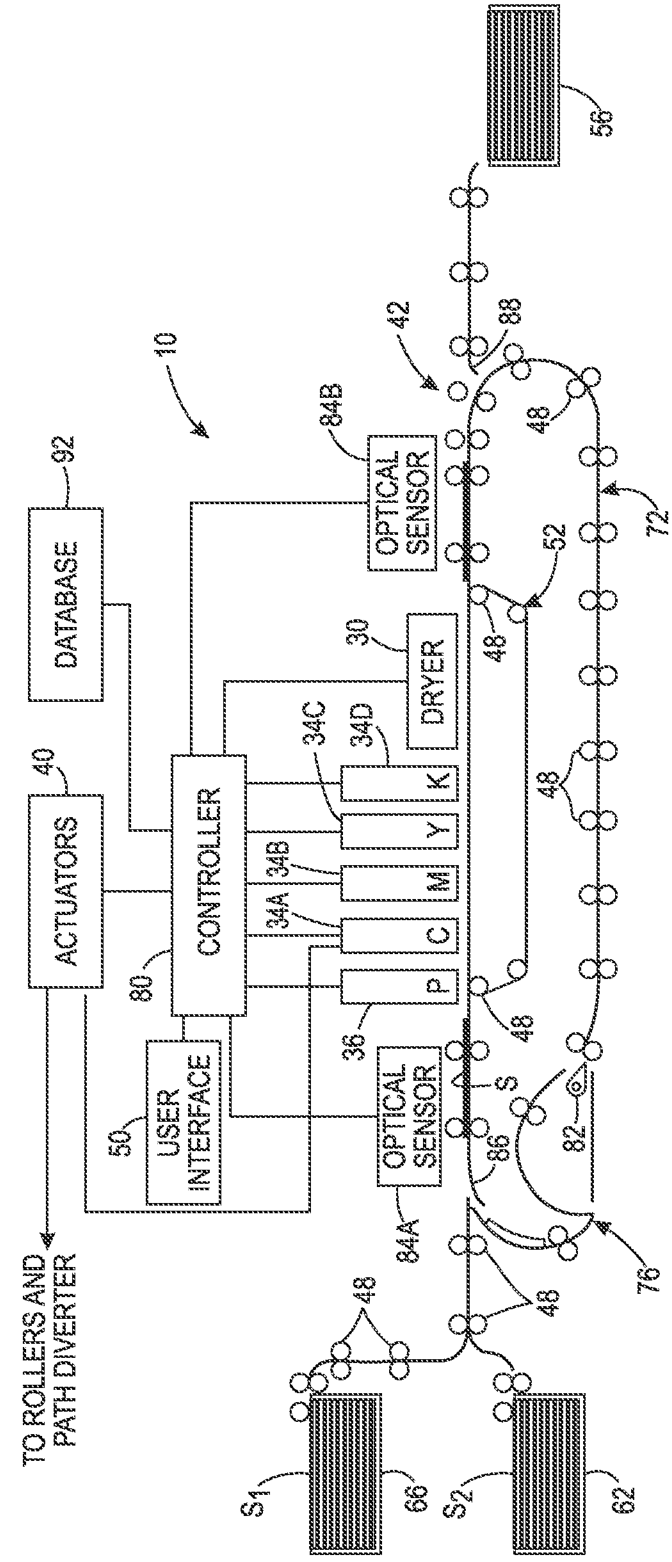
FIG. 1 is a schematic drawing of a color inkjet printer that is able to treat different widths of media with primers without applying primer to the media transport belt.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

The inkjet printer described below coats media with a primer using at least one printhead to apply primer to an endless belt and transfer the ejected primer onto the surface of the media in a roller nip. The primer, also referred to as a precoat composition, precoat, primer, or primer solution, is a metal salt solution that "crashes" or precipitates the pigments in the ink composition and prevents it from sinking or diffusing into the bulk of the media. The use of a metal salt solution as a primer has several advantages, including low material cost and the ability to improve print quality on both coated and uncoated paper. The effect of "crashing," precipitating, or causing the precipitation of a component of an ink can include any single chemical or combination of chemicals in relation to a printing ink or other printing related fluid that can facilitate the precipitation of one or more components in the ink. This precipitation is thought to be caused by component associations induced by a combination of the primer and/or component associations occurring with the primer.

Exemplary primers can be made with reference to the following table:

| Representative Primer Solution | | | Percentage |
|---|---|---|---|
| Chemical | Amt (g) | % by Wt | Range |
| Glycerol | 21.8 | 2.2 | 0-5 |
| Propylene Glycol, (but can also include other cosolvents like butanediol, pentanediol, hexanediol, glycol ethers like Diethylene Glycol Monoethyl Ether, Dipropylene Glycol Methyl Ether and other cosolvents present in ink) | 197.7 | 19.8 | 10-40 |
| Water | 509 | 50.9 | 30-70 |
| Magnesium Nitrate Hexahydrate (but could also include other Ca or Al salts) | 270 | 27.0 | 10-50 |
| Surfactant TT4000 (surfactants will similar characteristics can be used) | 7 | 0.7 | 0.1-3 |
| Biocide Proxel | 1.45 | 0.1 | 0.1-1 |
| | 1006.95 | 100.7 | |

Such primers are not adhesives, sealers, suspensions, or the like that have been previously used in inkjet printers to treat media prior to printing.

FIG. 1 depicts a high-speed color inkjet printer 10 that uses multiple application roller system to apply primer to media sheets in the printer before the media are printed. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads or a linear array of printheads that abut one another to enable media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media. Alternatively, the printer 10 can be configured in a known manner to print ink images on a continuous roll of media and the rolls of media can be changed between print jobs so different widths of media can be printed.

With further reference to FIG. 1, the printed image exits the print zone of printer 10 and passes under an image dryer 30 after the ink image is printed on a sheet S. As used in this document, the term "print zone" means an area of a media transport opposite the printheads of an inkjet printer. The image dryer 30 can include an infrared heater, a heated air blower, air returns, or combinations of these components to heat the ink image and at least partially fix an ink image to the sheet S. An infrared heater applies infrared heat to the printed image on the surface of the sheet S to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

Figure 2:
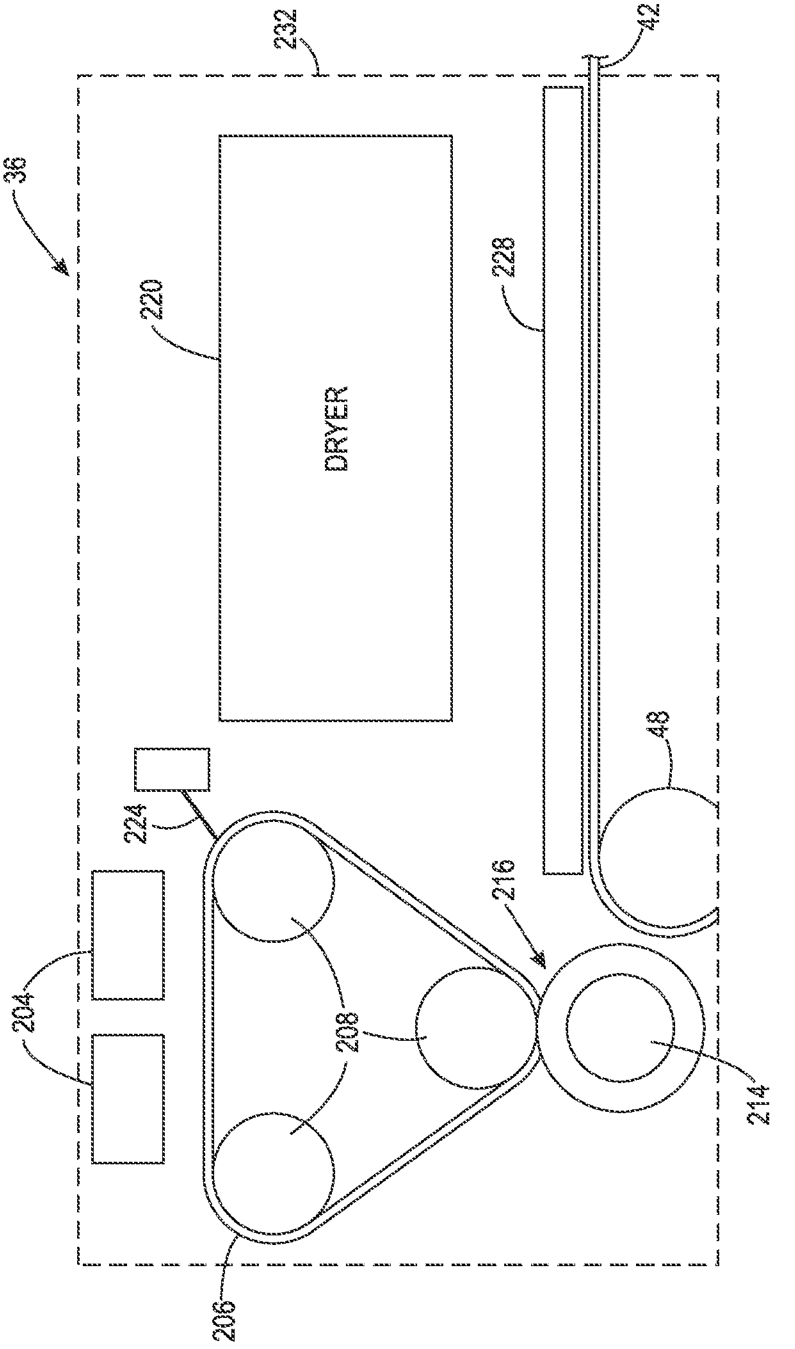
FIG. 2 is a side view of a new primer applicator that applies primer to different portions of the media to be printed without applying primer to the media transport belt.

Prior to reaching the print zone, the media passes beneath a primer application module 36. A side view of the primer application module 36 is presented in FIG. 2. The primer application module 36 is enclosed within a housing 232 that includes an endless belt 206 mounted around three rollers

208, at least one of which is driven by an actuator 40 (FIG. 1). The housing 232 isolates the primer application module 36 from the printhead modules 34A to 34D so satellite drops and the like produced by the printheads 204 do not impinge on the faceplates of the printheads within the modules 34A to 34D and vice versa. This isolation of the printheads ejecting two different types of materials helps ensure that the printheads retain their operational status. The belt and rollers are positioned so the belt passes by a plurality of printheads 204. The printheads are fluidly connected to a source of primer and the image content data for an image to be produced on the media are sent to the controller 80 from either a scanning system or an online or work station connection for processing and generation of the printhead control signals output to the printheads in module 36 and the printheads in printhead modules 34A-34D. The printhead control signals for the printheads in the printhead modules are generated to operate inkjets of a particular color. That is, these signals are used to produce a color separation of an ink image. The printhead control signals for the printheads in the primer application module 36 are for the composite ink image formed with the different color separations of the ink image. This composite image is formed on the belt 206 with primer drops ejected by the printheads 204 and carried by the belt to enter the nip 216 between the belt 206 and a nip roller 214.

The nip roller 214 ensures intimate contact between the media and the primer on the belt. To prevent low lying areas of the ejected primer from not touching the media and not being transferred to the media, the nip roller 214 is coated in a material that helps ensure sufficient pressure in the nip to press the media against the primer on the belt. The coating material can be a variety of elastomers, such as, silicone, viton, polyurethane, and the like. Since operating temperatures in the primer applicator are not excessively high, polyurethane or a dense/durable foam coating are adequate. The nip roller 214 and belt 206 are configured to provide a nip of 1-6 mm to help ensure effective transfer of the primer from the belt to the media. Entry of the primer image into the roller and entry of media into the nip are synchronized to transfer the primer image onto the media. The media sheet 228 carried by the belt of media transport 42 shown in FIG. 2 then passes beneath a dryer 220 to at least partially dry the primer image before the media sheet is printed by the printhead modules 34A to 34D. A blade 224 is provided to remove any residual primer from the belt 206 as the belt moves from the nip 216 to the printheads 204. The dryer 220 can be a radiant or convection dryer as is known. The dryer 220 is operatively connected to the controller 80 so the controller operates the dryer at an effective temperature for fixing the primer to the media after the transfer. The controller uses the print job parameter data and the image content data to identify the effective temperature for the dryer operation as the type of media, average area density, and the type of primer affect the fixing of the primer to the media.

Figure 3:
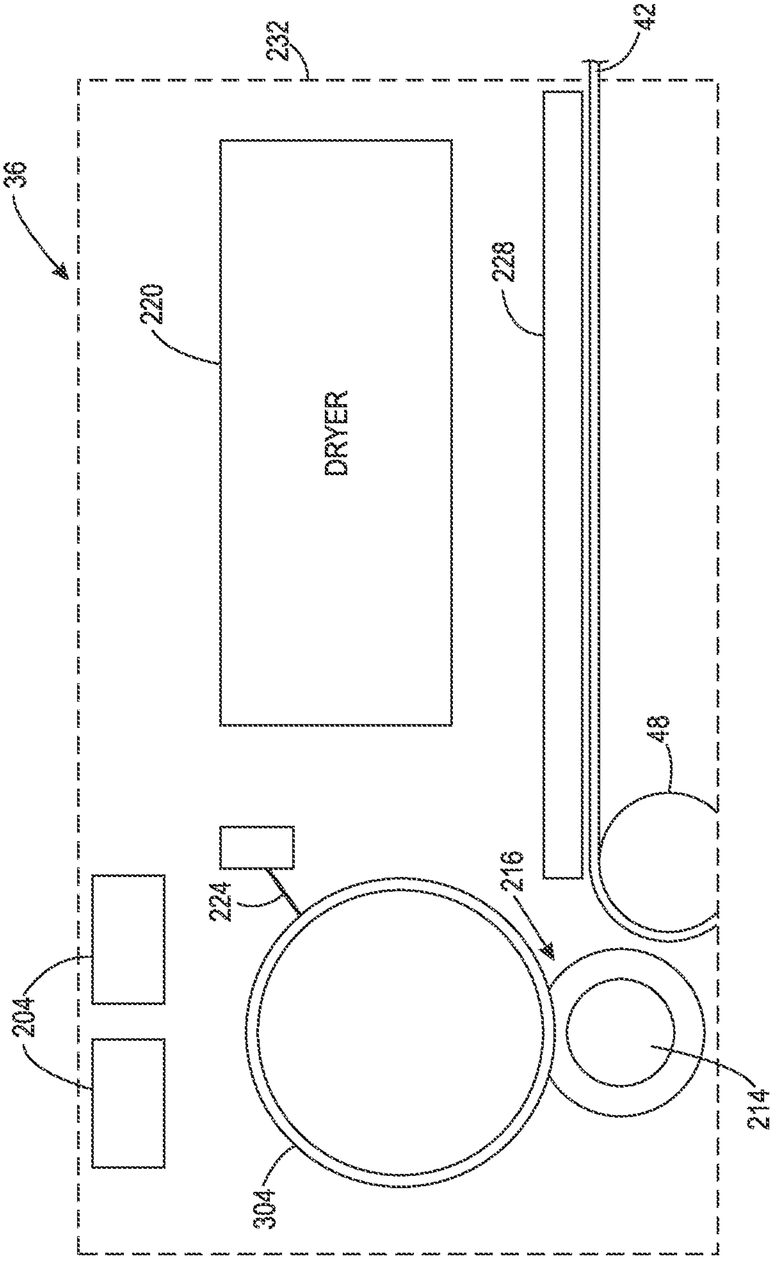
FIG. 3 is a side view of an alternative embodiment of the primer application module of FIG. 2 that uses a roller rather than an endless belt to receive a primer image and transfer it to media.

FIG. 3 is a side view of an alternative embodiment of the primer application module 36. In the depicted embodiment, the rollers 208 and endless belt 206 are replaced by a single roller 304. Again, a primer image is formed on the roller surface with primer drops ejected by the printheads 204 and the primer image is transferred to the media within the nip 216.

With further reference to FIG. 1, a return path 72 is provided to receive a sheet from the media transport 42 after a substrate has been completely or partially printed and passed through the dryer 30. The sheet is moved by the rotation of pulleys in a direction opposite to the direction of movement in the process direction past the printheads. An actuator 40 operatively connected to pivot 88 is operated by the controller 80 to either block entry to the return path 72 and direct the media to the receptacle 56 or direct the media to the return path 72. At position 76, the substrates on the return path 72 can either be turned over so they can merge into the job stream being carried by the media transport 42 and the opposite side of the media sheet can be printed or left as they are so the printed side of the sheet can be printed again. To leave the sheets as they are, the controller 80 operates an actuator to turn pivot 82 counterclockwise from the position shown in the figure so the sheets bypass the bend in the return path and are directed to position 76 without being turned over. Thus, the printed side of the sheet can be printed. If the controller 80 operates the actuator to turn pivot 82 clockwise to the position depicted in the figure, then the sheet goes over the bend and is flipped before being returned to the transport path 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84B. The optical sensor 84B generates image data of the printed sheets and this image data is analyzed by the controller 80 to detect streakiness in the printed images on the media sheets of a print job. Additionally, sheets that are printed with test pattern images are printed at intervals during the print job. Image data of these test pattern images generated by optical sensor 84B are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the correct mass or landing at an errant position is called an inoperative inkjet in this document. The controller can store data identifying the inoperative inkjets in database 92 operatively connected to the controller 80. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. For sheets that are not inverted and merged into the job stream by the operation of pivoting member 86, optical sensor 84A generates image data of the printed side and the controller 80 uses that image data to register the sheets and to operate the ejectors in the printhead to further print images on the previously printed sheet sides. The optical sensors 84A and 84B can be a digital camera, an array of LEDs and photodetectors, or other devices configured to generate image data of a passing surface. While FIG. 1 shows the printed sheets as being collected in the sheet receptacle 56, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 36, 34A-34D (and thus the printheads), the detector 38, the actuators 40, and the image dryer 30. The ESS or controller 80, for example, is a self-contained computer having a central processor unit (CPU) operatively connected to non-transitory, computer readable media, such as electronic data storage, and a display or user interface (UI) 50. The ESS or controller 80, for example, includes a sensor input and control circuit as well as a pixel placement and control circuit. In addition, the controller 80 reads, captures, prepares, and manages the image data flow between image input sources, such as a scanning system or an online or a work station connection (not shown), and the printhead modules 36 and 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in non-transitory, computer readable medium associated with the processors or controllers. The processors, their memories, and interface circuitry configure the controllers to perform the operations described below when the programmed instructions in the non-transitory, computer readable media are executed. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printheads in the primer application module 36 and the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

In both of the embodiments described above, primer is ejected from the printheads in the module 36 onto a belt or roller. The printhead can be a high resolution printhead, such as a 1200 dpi printhead, but a low resolution printhead, such as a 300 dpi printhead, is sufficient for forming primer images and is more economical. The ejection frequency of the printheads 204 should match the ejection frequency of the printheads in the printhead modules to ensure synching of the primer images with the ink images. The primer is deposited in an addressable, digital way to coincide with the locations where the ink drops are ejected. In this manner, primer is not applied to the media where no ink drops are ejected. Thus, different widths of media can be printed without applying primer to portions of the belt 206 or roller 304 that do not contact the surface of the media.

The endless belt 206 is composed of a material that facilitates transfer of the primer image from the belt to the media. Examples of such materials are polyimides, polyesters, polyamides, polyurethane, EPDM rubber, poly ether ether ketone (PEEK), poly aryl ether ketone (PAEK), polyether sulfone, polycarbonate, polyetherimide or composites thereof. The endless belt polymer material can additionally have additives incorporated into the belt material, such as carbon black, graphite, iron oxide, silica, titania, carbon fibers, glass fibers, and the like to improve mechanical and thermal properties. The endless belt material can also optionally have a coating of a fluorinated polymer such as PTFE, PFA, viton, FKM rubber, fluorinated polyurethane, or silicones or fluorosilicones to enable easy release of the primer and also to facilitate cleaning. The cleaning blade 224 can be made of rubber or other polymeric material that removes the residual primer from the belt without damaging the surface of the belt.

Figure 4:
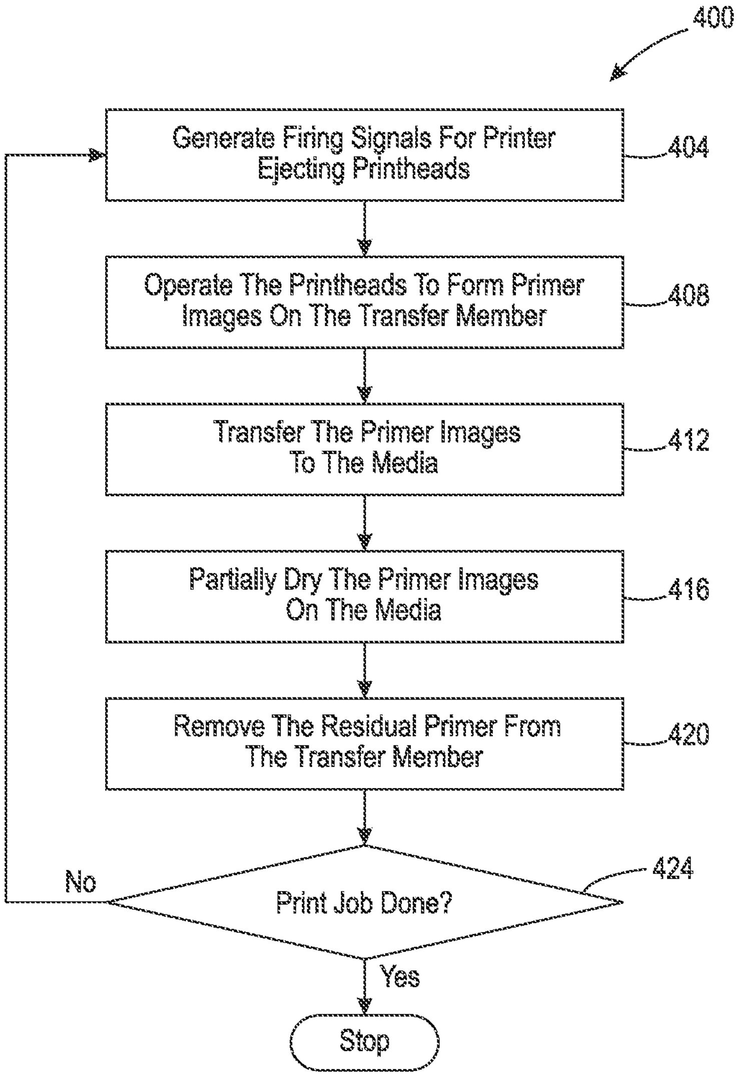
FIG. 4 is a flow diagram of a process for operating the inkjet printer of FIG. 1.

A process 400 for operating the inkjet printer of FIG. 1 to apply primer to different widths of media sheets is shown in FIG. 4. In the description of the process, statements that the process is performing some task or function refers to a controller or general purpose processor executing programmed instructions stored in non-transitory computer readable medium operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to perform one or more tasks or functions described herein. Additionally, the steps of the method may be performed in any feasible chronological order, regardless of the order shown in the figures or the order in which the processing is described.

The process 400 of FIG. 4 begins by generating printhead firing signals for the primer application module from the image content data for the ink images in a print job (block 404). The printheads in the primer application module are operated to form primer images on the transfer belt or roller (block 408). The primer images are transferred to the media in the nip (block 412) and the transferred primer images on the media are partially dried if at all before entering the print zone opposite the printheads of the printhead modules (block 416). The transfer belt or roller is cleaned to remove residual primer (block 420) until all of the ink images in the print job are printed (block 424).

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A primer applicator for an inkjet printer configured to print ink images, the primer applicator comprising:
- at least one printhead fluidly connected to a supply of primer;
- a transfer member positioned opposite the at least one printhead;
- a first actuator operatively connected to the transfer member, the actuator being configured to rotate the transfer member;
- a nip roller configured to form a nip with the transfer member; and
- a controller operatively connected to the at least one printhead and the first actuator, the controller being configured to:

operate the at least one printhead to form primer images on the transfer member, the primer images corresponding to the ink images; and operate the first actuator to rotate the transfer member to transfer primer images from the transfer member onto media passing through the nip prior to the ink images being printed on the media.

2. The primer applicator of claim 1, the transfer member further comprising:

a transfer roller having a diameter greater than a diameter of the nip roller.

3. The primer applicator of claim 2, the transfer member further comprising:

a plurality of rollers, at least one of which is rotated by a second actuator; and an endless belt mounted about the plurality of rollers, the endless belt being configured to rotate about the plurality of rollers.

4. The primer applicator of claim 3 wherein the endless belt consists essentially of a polyimide, polyester, polyamide, polyurethane, EPDM rubber, poly ether ether ketone (PEEK), poly aryl ether ketone (PAEK), polyether sulfone, polycarbonate, polyetherimide, or composites of these materials.

5. The primer applicator of claim 3, the nip roller further comprising:

a stainless steel roller; and a coating consisting essentially of silicone, viton, or polyurethane.

6. The primer applicator of claim 5 further comprising:

a dryer having a plurality of heating elements, the dryer being positioned to direct heat toward the media after the primer images are transferred to the media.

7. The primer applicator of claim 6 further comprising:

a primer remover configured to remove residual primer from the endless belt after the primer image has been transferred to the media.

8. The primer applicator of claim 7, the primer remover further comprising:

a blade that engages the endless belt.

9. The primer applicator of claim 8 wherein the blade consists essentially of rubber.

10. The primer applicator of claim 9 wherein the at least one printhead is a low resolution printhead configured to eject drops of a metal salt solution.

11. An inkjet printer comprising:

at least one first printhead;

a media transport for moving a media sheet through a print zone opposite the at least one first printhead in a process direction; and a primer applicator having:

at least one second printhead fluidly connected to a supply of primer;

a transfer member positioned opposite the at least one second printhead;

a first actuator operatively connected to the transfer member, the first actuator being configured to rotate the transfer member;

a nip roller configured to form a nip with the transfer member; and a controller operatively connected to the at least one first printhead, the at least one second printhead and the first actuator, the controller being configured to:

operate the at least one second printhead to form primer images on the transfer member;

operate the first actuator to rotate the transfer member to transfer primer images from the transfer member onto media passing through the nip; and operate the at least one first printhead to form ink images on the primer images on the media in the print zone.

12. The inkjet printer of claim 11, the transfer member further comprising:

a transfer roller having a diameter greater than a diameter of the nip roller.

13. The inkjet printer of claim 12, the transfer member further comprising:

a plurality of rollers, at least one of which is rotated by a second actuator; and an endless belt mounted about the plurality of rollers, the endless belt being configured to rotate about the plurality of rollers.

14. The inkjet printer of claim 13 wherein the endless belt consists essentially of a polyimide, polyester, polyamide, polyurethane, EPDM rubber, poly ether ether ketone (PEEK), poly aryl ether ketone (PAEK), polyether sulfone, polycarbonate, polyetherimide, or composites of these materials.

15. The inkjet printer of claim 13, the nip roller further comprising:

a stainless steel roller; and a coating consisting essentially of silicone, viton, or polyurethane.

16. The inkjet printer of claim 15 further comprising:

a dryer having a plurality of heating elements, the dryer being positioned to direct heat toward the media after the primer images are transferred to the media.

17. The inkjet printer of claim 16 further comprising:

a primer remover configured to remove residual primer from the endless belt after the primer image has been transferred to the media.

18. The inkjet printer of claim 17, the primer remover further comprising:

a blade that engages the endless belt.

19. The inkjet printer of claim 18 wherein the blade consists essentially of rubber.

20. The inkjet printer of claim 19 wherein the at least one second printhead is a low resolution printhead configured to eject drops of a metal salt solution.

21. A method for operating an inkjet printer comprising:

operating a media transport to move a plurality of media sheets through a print zone opposite at least one printhead in a process direction;

forming a primer image on a transfer member; and transferring the primer image from the transfer member to the media before the media enters the print zone.

22. The method of claim 21, the forming of the primer image further comprising:

operating at least one other printhead to eject drops of the primer onto the transfer member.

23. The method of claim 22 wherein the at least one other printhead has a resolution that is lower than a resolution of the at least one printhead, the at least one other printhead being configured to eject a metal salt solution.

24. The method of claim 23 wherein the at least one other printhead has a resolution of 300 drops per inch.

25. The method of claim 24 further comprising:

rotating the transfer member about a plurality of rollers.

26. The method of claim 25 wherein the transfer member is an endless belt.

27. The method of claim 24 further comprising:
operating an actuator to rotate the transfer member about a longitudinal axis.

28. The method of claim 24, the transferring of the primer image from the transfer member to the media further comprising:
forming a nip with the transfer member and a nip roller; and
directing the media through the nip.

29. The method of claim 28 further comprising:
at least partially drying the primer image on the media before the media passes the at least one printhead.

30. The method of claim 29 further comprising:
removing residual primer from the transfer member after the primer image is transferred from the transfer member to the media.

* * * * *